(12) United States Patent
Chatterjee et al.

(10) Patent No.: US 7,136,867 B1
(45) Date of Patent: Nov. 14, 2006

(54) METADATA FORMAT FOR HIERARCHICAL DATA STORAGE ON A RAW STORAGE DEVICE

(75) Inventors: Surojit Chatterjee, Foster City, CA (US); Alok K. Srivastava, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 528 days.

(21) Appl. No.: 10/308,809

(22) Filed: Dec. 2, 2002

Related U.S. Application Data

(60) Provisional application No. 60/370,963, filed on Apr. 8, 2002, provisional application No. 60/372,186, filed on Apr. 12, 2002.

(51) Int. Cl.
G06F 17/30 (2006.01)
(52) U.S. Cl. ..................................... 707/102
(58) Field of Classification Search ........ 707/200–205, 707/1–10, 100–104.1, 103 R, 102; 717/108; 715/760; 709/224; 380/30
See application file for complete search history.

(56) References Cited

U.S. PATENT DOCUMENTS

| | | | |
|---|---|---|---|
| 4,817,091 A | 3/1989 | Katzman et al. | |
| 5,201,000 A * | 4/1993 | Matyas et al. | 380/30 |
| 5,991,776 A | 11/1999 | Bennett et al. | 707/205 |
| 6,016,499 A | 1/2000 | Ferguson | |
| 6,047,285 A | 4/2000 | Jacobs et al. | |
| 6,061,677 A * | 5/2000 | Blinn et al. | 707/3 |
| 6,066,192 A * | 5/2000 | Toshinaga et al. | 95/93 |
| 6,067,584 A | 5/2000 | Hayles et al. | |
| 6,105,025 A | 8/2000 | Jacobs et al. | |
| 6,292,795 B1 | 9/2001 | Peters et al. | |
| 6,327,594 B1 | 12/2001 | Van Huben et al. | |
| 6,345,382 B1 | 2/2002 | Hughes | |
| 6,421,662 B1 | 7/2002 | Karten | 707/3 |
| 2003/0191739 A1 | 10/2003 | Chatterjee et al. | |

OTHER PUBLICATIONS

Sylvia Ratnasamy et al., "A scalable content-addressable network", 2001, ACM Press, NY, NY, pp. 161-172.*
Gisli R. Hjaltason et al, "Speeding up bulk-loading of quadtrees", 1997, ACM Press, NY, NY, pp. 50-53.*
International Preliminary Examining Authority, "Notification of Transmittal of the International Preliminary Examination Report," Jul. 13, 2004, 18 pages.
Current claims in PCT application, International Application No. PCT/US03/09407, 10 pages.
Oracle Corporation, "Oracle 8i, Administrator's Guide," Release 2 (8.1.6), Dec. 1999, Part No. A76956-01, Chapter 16, 14 pages.
Jim Gray et al., "Transaction Processing: Concepts and Techniques," 1993, pp. 556-558.
Werner Vogels et al., "The Design and Architecture of the Microsoft Cluster Service, A Practical Approach to High-Availability and Scalability," May 1997, Cornell University Dept. of CS Technical Report, number assignment in preparation, 10 pages.

(Continued)

Primary Examiner—Diane Mizrahi
(74) Attorney, Agent, or Firm—Hickman Palermo Truong & Becker, LLP

(57) ABSTRACT

A system and techniques are described for formatting a persistent storage device to store hierarchical data. According to one aspect of the invention, data structures are established, at a base level of the persistent storage device, for storing a hierarchy of key-value pairs. A first structure, which corresponds to a root node of the hierarchy, is established. A second structure, which corresponds to a key-value pair, is established. The second structure stores the value of the key-value pair. Links, which lead from the first structure to the second structure through one or more intermediate structures, are established based on a position, within the hierarchy, of the key.

33 Claims, 6 Drawing Sheets

OTHER PUBLICATIONS

Werner Vogels et al., "Scalability of the Microsoft Cluster Service," undated, 9 pages.

Gregory F. Pfister, "Second Edition, In Search of Clusters, The Ongoing Battle in Lowly Parallel Computing," 1995, Chapter 4, pp. 71-84.

Murthy Devarakonda et al., "Recovery in the Calypso File System," ACM Transactions on Computer Systems, vol. 14, No. 3, Aug. 1996, pp. 287-310.

Marshall Kirk McKusick et al., "A Fast File System for UNIX*," Revised Feb. 18, 1984, pp. 1-14.

Mendel Rosenblum et al., "The Design and Implementation of a Log-Structured File System," Jul. 24, 1991, pp. 1-15.

Gregory R. Ganger et al., "Embedded Inodes and Explicit Grouping: Exploiting Disk Bandwidth for Small Files," First appeared in the Proceedings of the USENIX Technical Conference, Jan. 1997, pp. 1-17.

Keith Smith et al., "File Layout and File System Performance," TR-35-94, undated, pp. 1-23.

Tatu Ylönen, "Shadow Paging Is Feasible," undated, pp. 1-15.

Tatu Ylönen, "Write Optimizations and Clustering in Concurrent Shadow Paging," undated, pp. 1-16.

Tatu Ylönen, "Concurrent Shadow Paging: A New Direction for Database Research," undated, pp. 1-7.

Hewlett-Packard Company, "The Gold Standard: Cluster File System in hp *TruCluster* Server, Extending the advantages of single-system file systems to high availability clusters," Oct. 2002, pp. 1-16.

Tim Read et al., "Robust Clustering: A Comparison of Sun™ Cluster 3.0 versus Sun Cluster 2.2 Software," Sun BluePrints™OnLine-Sep. 2001, pp. 1-23.

Microsoft Corporation, "Microsoft® Windows2000 Advanced Server, Windows 2000 Clustering Technologies: Cluster Service Architecture," 2000, 27 pages.

Sun® Microsystems, Inc., "The Sun Enterprise Cluster Architecture, Technical White Paper," 1997, pp. 1-74.

Compaq Computer Corporation, UNIX Software Division, "Cluster File System in Compaq *TruCluster* Server, Extending the advantages of single-system file systems to high availability clusters," Sep. 2001, pp. 1-13.

Compaq Computer Corporation, UNIX Software Division, "Cluster File System in Compaq *TruCluster* Server: Extending the advantages of single-system file systems to high availability clusters," Sep. 2001, pp. 1-13.

European Patent Office, "International Search Report," application No. 03716862.2-1527, dated Jun. 8, 2005, 7 pages.

* cited by examiner

METADATA FORMAT FOR HIERARCHICAL DATA STORAGE ON A RAW STORAGE DEVICE

RELATED APPLICATIONS

The present application claims priority to the following provisional U.S. patent applications, the entire contents of which are incorporated herein for all purposes:

U.S. Provisional Patent Application No. 60/370,963 entitled "Personalized Content Within a Global Namespace", filed Apr. 8, 2002; and U.S. Provisional Patent Application No. 60/372,186 entitled "Approach for Personalized Content Within a Global Namespace", filed Apr. 12, 2002.

The present application is also related to the following non-provisional U.S. patent applications, the entire contents of which are incorporated herein for all purposes:

U.S. patent application Ser. No. 10/232,907 entitled "Use of Dynamic Hash Tree for Managing Hierarchically Structured Information" filed on Aug. 30, 2002 by Surojit Chatterjee and Sameer Joshi;

U.S. patent application Ser. No. 10/304,449 entitled "Mechanism for Creating Member Private Data in a Global Namespace" filed on Nov. 25, 2002 by Surojit Chatterjee and Alok K. Srivastava; and U.S. patent application Ser. No. 10/253,088 entitled "Persistent Key-Value Repository with a Pluggable Architecture to Abstract Physical Storage" filed on Sep. 23, 2002 by Surojit Chatterjee, Raj Kumar, Jonathan Creighton, Alok K. Srivastava, and Sameer Joshi.

FIELD OF THE INVENTION

The present invention relates to data storage and, more specifically, to storing hierarchical data on a persistent storage device.

BACKGROUND OF THE INVENTION

Hierarchical Data Model

A data model provides the general structure of a database. A data model can be viewed as a collection of conceptual tools for describing data, data relationships, data semantics, and consistency constraints.

It is often useful to model data in a hierarchical structure. In a hierarchical model, data and relationships among data are represented by records and links, respectively. Hierarchically modeled data is logically structured as a "tree", which includes a conglomeration of parent-child relationships between data within the hierarchical structure. LDAP (Lightweight Directory Access Protocol) and Microsoft® Windows® registry are examples of uses of hierarchically modeled or structured information.

FIG. 1 is a diagram graphically illustrating hierarchically structured, or related, data. Structuring data hierarchically provides some benefits over other data structures. It is easier to explore hierarchically structured data than other data structures, due to the inherent semantical benefits of the hierarchical structure. For example, one can intuitively traverse a hierarchy to locate a specific data item of interest.

Key name-value (or name-value) pairs generally represent hierarchically organized data. More specifically, each item of information is identified within the hierarchy by a key name consisting of key components. The term "key name" is generally used herein to refer to a specific value within the key domain associated with the hierarchy. For example, a key domain may be network IP addresses and an associated key name may be 255.255.000.000. For another example, a domain may be the collection of URLs associated with the public Internet, and an associated key of the domain may be a specific URL associated with a specific web page.

For example, a file's location in a hierarchical directory may be identified as: C:\My Documents\example.doc, wherein each backslash separates levels of the associated hierarchy. More generally, information may be identified by a key name represented as a character string, such as a.b.d.e, where key component e is a child (i.e., a descendant) of key component d, key component d is a child of key component b, and so on, to the hierarchy root. In some contexts, hierarchically organized information contains name-value pairs. A value is information associated with a name. For example, in the foregoing hierarchical directory path, "My Documents\example.doc" is a name of a name-value pair, and the content of the file is the value of the name-value pair.

FIG. 1 illustrates that a hierarchical structure has levels associated with the structure, and thus, the key name. That is, each key name has as many levels as the number of key components in the key name. For example, items x and a are one level from the root, so they are considered at Level 1; items z, c, and d are three levels from the root and are considered at Level 3.

Using Hierarchical Data in a Distributed System

A distributed system may include multiple logical computational units. Each logical computational unit may be referred to as a "member" of the distributed system. Thus, a member may be a network-connected personal computer, workstation, central processing unit (CPU), or other logical computational unit such as an instance of a program. Members of a distributed system can communicate with each other.

Multiple members of a distributed system may share a common entity. One such shared entity is a shared file system. All of the members in the distributed system may directly access the shared file system (e.g., through a network). All of the members in the distributed system can see a given file within the shared file system. All of the members within the distributed system may access the contents of the given file.

Multiple members of a distributed system may share a single registry. A registry is a data repository that stores configuration information, typically in the form of key-value pairs. A single registry may store configuration information for multiple databases that are stored on a single shared storage subsystem. A registry may organize data according to the hierarchical data model described above. Configuration information for multiple databases may be hierarchically organized beneath a single root.

In a registry, key-value pairs typically possess the special characteristic of having key names that are larger than associated values. Additionally, key-value pairs in a registry usually possess the special characteristic of being associated with many child keys (i.e., keys that are subordinately related to a parent key in a hierarchy) but few values (one value per key-value pair is normal). Furthermore, because key-value pairs in a registry usually reference configuration data that is unlikely to be modified after an initial configuration of a program or database, values of such pairs typically possess the special characteristic of being read more frequently than they are updated. Also, because the values maintained in a registry for a particular program must typically be read in order for the program to begin execution, delays in the run-time recovery (e.g., after a crash) of data stored in a registry are less tolerable. Such special characteristics are a typical of structures found in most file systems.

Key-value pairs may be stored on persistent storage devices such as hard disk drives. In the past, key-value pairs have been stored on devices that are already formatted according to some file system. In this context, formatting means creating one or more data structures that may be used to locate information on the device (e.g., a file allocation table), and erasing any such data structures existing on the device prior to the formatting. Thus, formatting in this context means formatting at a base level of the device, where that base level is a level at which such data structures are usually found. For example, a Microsoft Windows registry is stored in a file on a hard disk drive, or a partition thereof, that is formatted according to a general-purpose file system that is provided by a Microsoft operating system.

The manner in which a device is formatted can significantly affect the time required to access or recover data stored on that device. Unfortunately, the formatting used by many file systems is not optimized to handle key-value pairs that possess the special characteristics described above. Most file systems use formatting that is optimized to handle file names that are considerably smaller than the contents associated with those files. Most file systems use formatting that is optimized to handle many files per directory. Because files may be written as often or more often than they are read, most file systems use formatting that optimizes write operation performance without regard to any consequential degradation in read operation performance. Furthermore, because many files may be unrelated to the configuration of a program, the formatting used by most file systems is not optimized to quickly recover the contents of files in the event of a failure. This formatting can result in unnecessary inefficiencies when handling registry data that possesses the special characteristics mentioned above.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
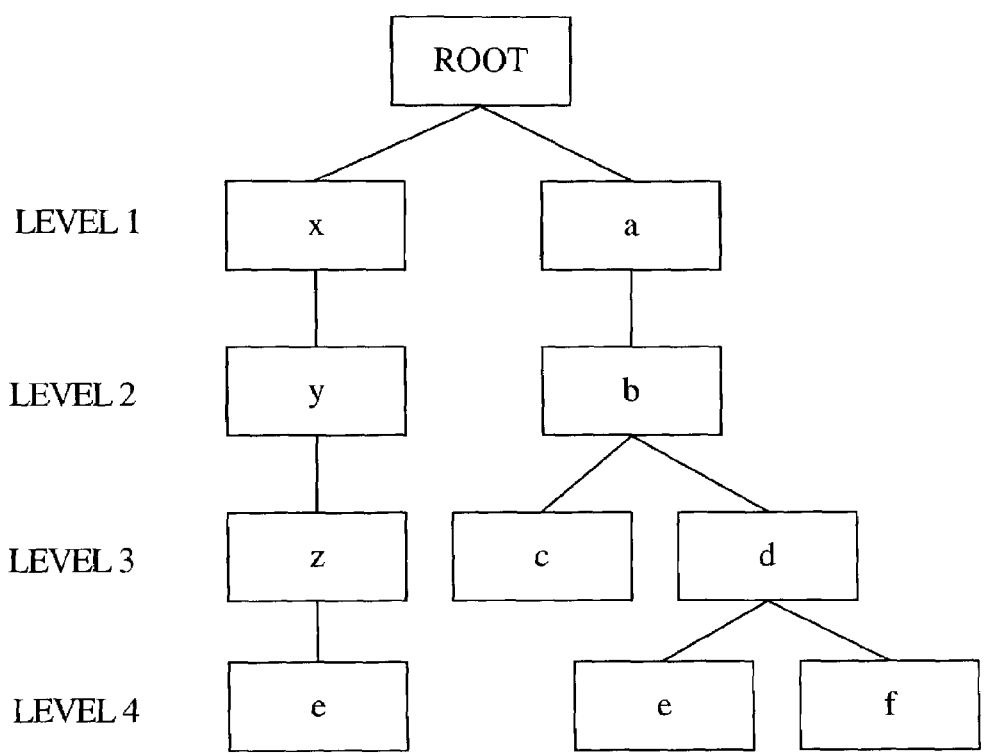
FIG. 1 is a diagram graphically illustrating hierarchically structured, or related, data.

A method and system for formatting a persistent storage device to store hierarchical data is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

The techniques and systems described below are optimized for handling key-value pairs that possess the special characteristics, described above, that are typically possessed by key-value pairs. A technique is provided for formatting a persistent storage device (e.g., a hard drive) to establish structures, on that device, that are optimized for storing a hierarchy of such key-value pairs, unlike the structures of existing file systems. Such structures may also be established on a persistent storage device that has already been formatted with a file system. The structures mentioned above may be established via a single file in an existing file system. The organization of these structures on the persistent storage device is also described.

These structures are especially adapted for referencing keys that are larger than associated values. Additionally, these structures are especially adapted for keys that are associated with many child keys but few values (e.g., one value per key). Furthermore, these structures are especially adapted to reference values of key-value pairs that are read more frequently than they are updated. Also, these structures are especially adapted to permit fast run-time recovery of data stored in a registry.

Some of the techniques disclosed below make use of shadow paging and logging to provide redundancy in the structures and structural organizations described below. This redundancy allows for greater fault tolerance and fast recovery, which is especially important when dealing with registry data. Although such redundancy might not be practical when dealing with kinds of data other than registry data, this redundancy is especially practical in light of the characteristics (e.g., small size) of the data being made redundant. The use of shadow paging causes any performance penalty to be suffered during write operations rather than read operations. Because metadata is read much more frequently than it is written, shadow paging is used to make metadata redundant. Logging is used to make other data redundant.

Persistent Storage Device Format for Storing Hierarchical Data

A persistent storage device may include one or more logical volumes or partitions. Typically, before a partition may be used to store data, the partition must be formatted. In this context, formatting means creating one or more data structures that may be used to locate information on the partition, and erasing any such data structures that may exist on the partition prior to the formatting. Each partition may be referenced by some name (e.g., "D:") as part of a naming scheme for multiple partitions.

Figure 2:
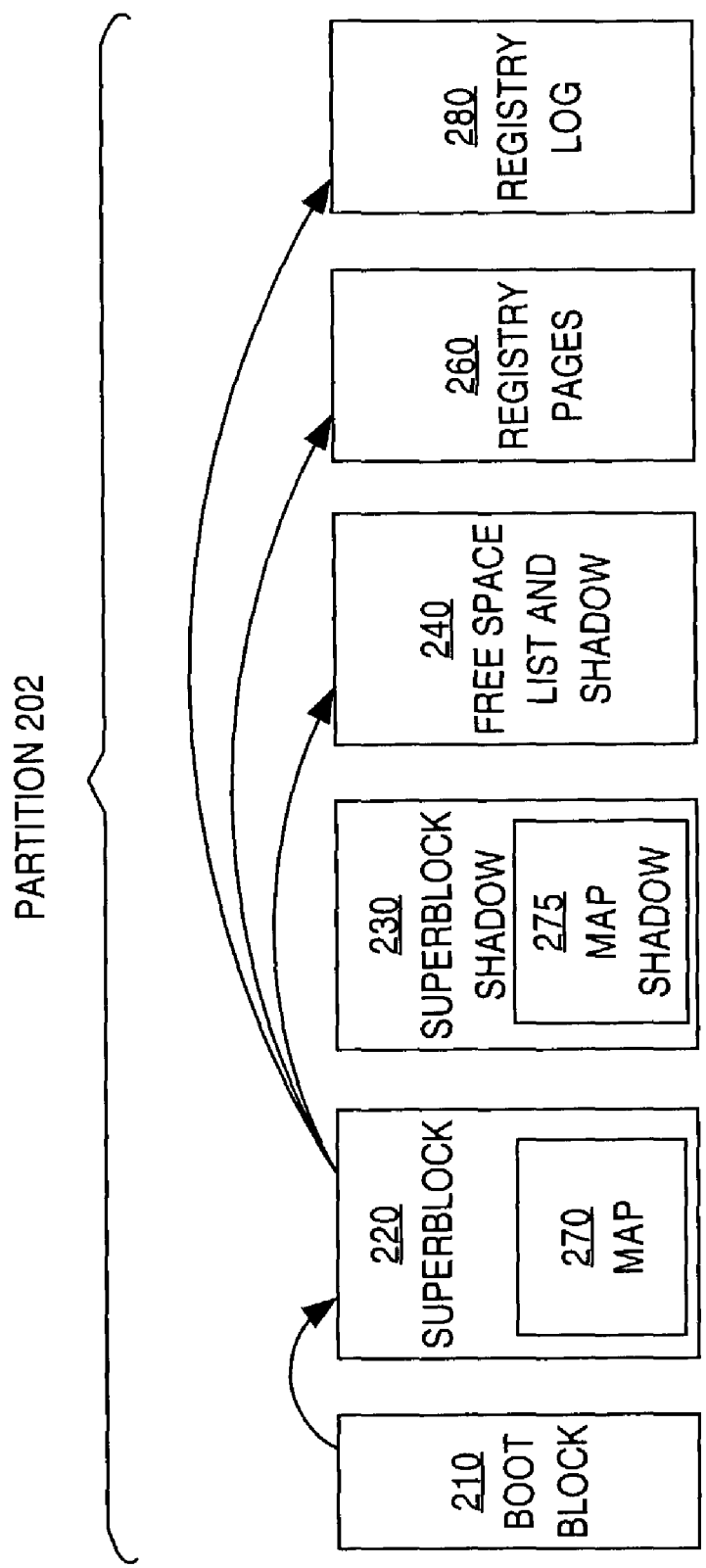
FIG. 2 is a block diagram of a partition of a persistent storage device formatted according to an embodiment of the invention.

FIG. 2 is a block diagram of a partition 202 of a persistent storage device formatted according to an embodiment of the invention. The formatting described hereafter may be performed with regard to a single partition of a persistent storage device, leaving other partitions unaffected by the formatting.

Referring to FIG. 2, a boot block 210 is located at a start of the partition 202. In other words, boot block 210 is located at offset zero relative to the beginning of partition 202. In one embodiment, the size of boot block 210 is the minimum block size allowable by the system that creates the partition 202. For example, boot block 210 may be 512 bytes long. The partition 202 also includes a superblock 220, a superblock shadow 230, a free space list and shadow 240, registry pages 260, and a registry log 280. Each of these structures is described in greater detail hereafter.

The Boot Block

Boot block 210 includes a string that uniquely identifies the partition 202. Boot block 210 may also include a date and time of the creation of boot block 210. Boot block 210 includes a pointer to superblock 220. Therefore, to locate superblock 220, reference is first made to boot block 210.

In one embodiment, the size of the boot block is the same as the minimum block size supported by the operating system. As a result, updates to the boot block are atomic.

In one embodiment, the boot block contains a flag that signifies whether a most recent update operation was successful. The flag may be used for recovery purposes, as is discussed in greater detail below in the section entitled "RECOVERING REGISTRY DATA".

The Superblock and Superblock Shadow

According to one embodiment, superblock 220 is of the same size as boot block 210; that is, the minimum block size allowable by the system that created the partition. Superblock 220 includes pointers to free space list and shadow 240, registry pages 260, and registry log 280. Superblock 220 also includes map 270.

Superblock shadow 230 is used in shadow paging. Shadow paging is well known and needs not be described in exhaustive detail herein. Superblock shadow 230 is a shadow of superblock 220. As such, superblock shadow 230 includes a map shadow 275. Map shadow 275 is a shadow of map 270.

Updating the Superblock

Figure 3:
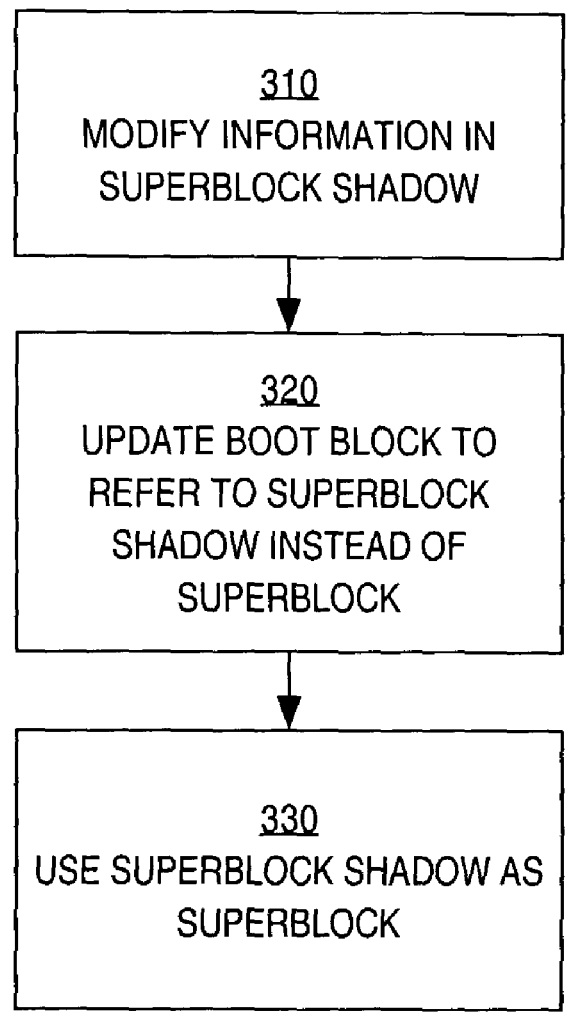
FIG. 3 is a flow diagram that illustrates a technique for updating information in a superblock, according to one embodiment.

In one embodiment, when information in superblock 220 is to be updated, instead of modifying information in superblock 220, the steps illustrated in FIG. 3 are performed. FIG. 3 is a flow diagram that illustrates a technique for updating information in a superblock, according to one embodiment.

Referring to FIG. 3, in block 310, when a modification is to be made to a superblock, the update is instead made to a superblock shadow that is associated with the superblock. For example, information may be modified in superblock shadow 230 instead of superblock 220.

In block 320, a boot block is updated to change data that currently refers to the superblock to cause the data to refer instead to the superblock shadow. For example, a reference within boot block 210 may be modified to refer to superblock shadow 230 instead of superblock 220. Boot block 210 may be so modified in one write operation.

In block 330, the updated superblock shadow is used as the new superblock. This technique ensures that updates are atomic. Data is first manipulated in memory and then written to the persistent storage device as a block of data. If a fault (e.g., a system crash) occurs at any point during the update process, then none of the modifications made prior to the failure will be visible because boot block 210 will still point to unmodified superblock 220.

The Free Space List and Shadow

According to one embodiment, at least a part of a partition of a persistent storage device is divided into registry pages 260. Therefore, each one of registry pages 260 is a certain defined space on a persistent storage device. Each one of registry pages 260 may represent a key-value pair in a hierarchy of key-value pairs. Each registry page is of some specified size. For example, each registry page may be 4 kilobytes long.

For each of registry pages 260, free space list and shadow 240 contains a unique entry that is associated with that registry page. Each entry signifies, through an indicator, whether the registry page associated with that entry is free or in use. For example, a "1" may indicate that the associated registry page is in use, and a "0" may indicate that the associated registry page is free. Free space list and shadow 240 may be implemented as an array of bits.

In one embodiment, free space list and shadow 240 spans over multiple registry pages. Registry pages that are used for free space list and shadow 240 may be referred to as "bitmap" pages. Because the management of free space list and shadow 240 may directly impact the performance of the shared repository, read and write operations are minimized.

For each bitmap page, a free space change list may be maintained. Each free space change list contains a list of intended changes to free space list and shadow 240 that is stored on permanent storage. The list of intended changes may be committed atomically using a shadow update mechanism. The list of intended changes may be stored as a linked list.

Each free space change list may contain a bit that indicates whether the corresponding bitmap page needs to be changed. Each free space change list may contain a reference to an in-memory image of the corresponding bitmap page. The bit is set to a null value unless some registry pages need to be reserved and the bits that correspond to those registry pages are within the bitmap page that contains the bit.

To reduce the time required to find free pages, in one embodiment, when a free page is found, an index that corresponds to the free space change list is recorded. Also, a bit number of the bitmap page in which the last free page was located is recorded in the corresponding free space change list. The next time that a free page needs to be found, the recorded free space change list is searched first. Also, the search for a free page inside the bitmap page begins from the recorded bit number.

Each entry in free space list and shadow 240 includes an original indicator. Each entry also includes a shadow of that original indicator. In one embodiment, superblock 220 includes a map 270 that indicates, for each entry in free space list and shadow 240, whether the entry has been updated an even or odd number of times. When an entry in free space list and shadow 240 is updated, map 270 is also updated to indicate whether that entry has been updated an even or odd number of times.

Managing Free Space

Taken together, multiple registry pages form a tree structure comprised of nodes. Nodes in the tree structure are data structures that are referred to herein as "tree nodes" or "t-nodes." Each of the registry pages stores a t-node. However, t-nodes need not be stored contiguously. Each t-node corresponds to a key in a hierarchy of keys (which has the same organization as the tree structure). A first of the registry pages is a root t-node of the tree structure.

As discussed above with reference to FIG. 2, superblock 220 includes a pointer to registry pages 260. More precisely, in certain embodiments, superblock 220 includes a pointer to a fixed offset from the beginning of the partition. At this fixed offset, the first of registry pages 260 is stored.

According to one embodiment, for each particular registry page, map 270 includes an indicator that indicates whether the particular registry page has been updated an even or odd number of times. Each indicator therefore indicates whether the original or shadow in the corresponding entry of free space list and shadow 240 should be used when determining whether a particular one of registry pages 260 is free or in use. For example, if map 270 indicates that the Nth entry in free space list and shadow 240 has been updated an even number of times, then the original indicator in the Nth entry in free space list and shadow 240 contains current information as to whether the associated registry page is free or in use. Alternatively, if map 270 indicates that the Nth entry in free space list and shadow 240 has been updated an odd number of times, then the shadow of the original indicator in the Nth entry in free space list and shadow 240 contains current information as to whether the associated registry page is free or in use. An example of map 270 (also referred to as the "free space list shadow map") is illustrated in Table 1 below.

TABLE 1

| Free space list page number | Indicator |
| --- | --- |
| 0 | 0 (even number of updates) |
| 1 | 0 (even number of updates) |
| 2 | 1 (odd number of updates) |

When map 270 is updated, it is updated in an in-memory copy of superblock 220. The in-memory superblock 220 is then written into the shadow space for the superblock. Then boot block 210 is updated and written to disk to indicate the new location for superblock 220.

Therefore, if an operation fails before boot block 210 is updated, then the existing boot block points to an image of superblock 220 as the superblock existed prior to the start of the operation. Superblock 220 points to free space list and shadow 240 that existed before the start of the operation.

Example Tree Structure

Figure 4A:
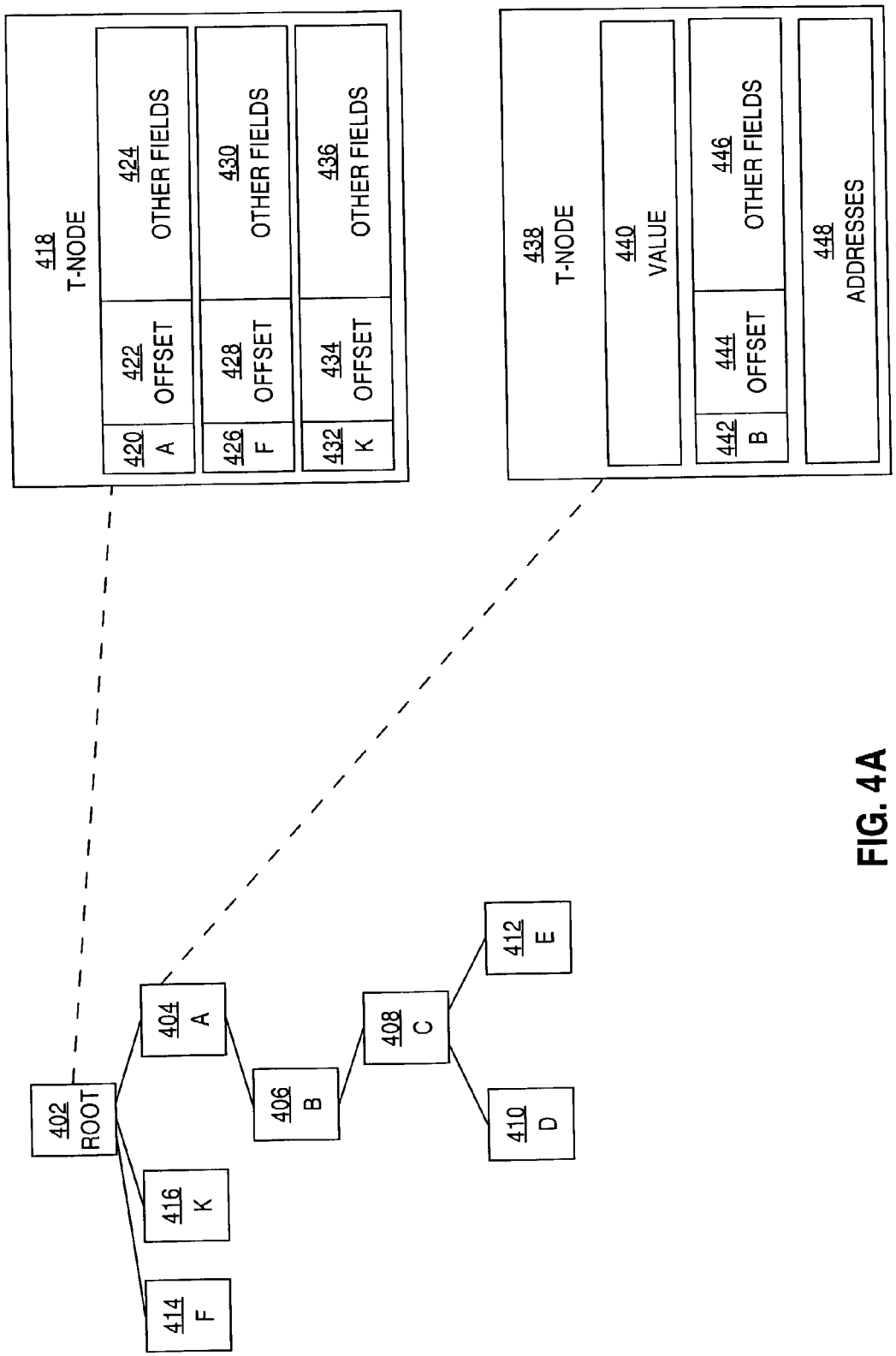
FIG. 4A is a block diagram that shows an example of a hierarchical data structure with associated t-nodes, according to one embodiment.

FIG. 4A is a block diagram that shows an example of a hierarchical data structure with associated t-nodes, according to one embodiment. The hierarchical data structure is a tree of keys. Keys may be parents of, and children of, other keys. For example, key "A" 404 is referred to as a parent key of key "B" 406. Likewise, key "B" 406 is referred to as a child key of key "A" 404.

Each key may be associated with a value. For example, key "A" 404 may be associated with a value "1". Key "B" 406 may be associated with a value "2". Key "C" 408 may be associated with a value "3". Key "D" 410 may be associated with a value "4". Key "E" 412 may be associated with a value "5".

The tree includes a root key 402. Root key 402 may be invisible to the users of the distributed system. In other words, root key 402 is hidden and is not made visible to the users of the distributed system. In this example, root key 402 is a parent key of key "A" 404, key "F" 414, and key "K" 416. When a particular key is created without an explicit designation of a parent key of the particular key, the parent key of the particular key is implicitly designated to be the root key.

The T-Nodes

Each key is associated with a t-node. Each t-node is located at a particular location (i.e., offset) on a storage device. The location of a t-node that is associated with a particular key is stored in a t-node that is associated with a parent key of the particular key.

While reference is made above to a tree structure, any t-node in the tree structure may have more than one parent t-node. Links between parent t-nodes and child t-nodes may be added or deleted to reflect corresponding changes in relationships between the keys in the hierarchy of key-value pairs. When a given t-node has no parent t-node (and therefore no other t-node includes links to that t-node), then the registry page that is that t-node may be indicated (e.g., in free space list and shadow 440) to be free and not in use (i.e., available).

In this example, root key 402 is associated with a t-node 418. T-node 418 includes information for each t-node that is associated with a child key of root key 402. Because root key 402 is the parent key of key "A" 404, key "F" 414, and key "K" 416, t-node 402 includes information for t-nodes associated with each of key "A" 404, key "F" 414, and key "K" 416. Information for a t-node associated with a particular key is called a "key component entry" for the particular key.

According to one embodiment, each dot-separated name inside a full key path name is called a key component. While, in one embodiment, dots separate key components inside a full key path, in alternative embodiments, other delimiting characters (e.g., "\", "/", ":", etc.) separate key components inside a full key path. For each key component there is a corresponding key component entry. Key component entries are variable in size to take into account widely different size of key names. In one embodiment, up to 255 characters are allowed for each key component, and up to 255 bytes are reserved for each key component name. In one embodiment, a key component name is one or more characters. A key component entry includes a name of the key component and, in one embodiment, a 4 byte logical address of a registry page that stores a t-node that is associated with the key.

A key component entry for key "A" 404 includes a key component name ("A") 420, an offset 422, and other fields 424. Similarly, a key component entry for key "F" 414 includes a key component name ("F") 426, an offset 428, and other fields 430. Likewise, a key component entry for key "K" 416 includes a key component name ("K") 432, an offset 434, and other fields 436.

Offset 422 provides the location, on a storage device, of a t-node that is associated with key "A" 404. Similarly, offset 428 provides the location, on the storage device, of a t-node that is associated with key "F" 414. Likewise, offset 434 provides the location, on the storage device, of a t-node that is associated with key "K" 416.

Therefore, offset 422 provides the location of a t-node 438 that is associated with key "A" 404. Each t-node includes the value of the key that corresponds to that t-node. Thus, both data (e.g., value) and metadata (e.g., key name) are encapsulated within the same t-node data structure. T-node 438 includes a value 440 that is the value of key "A" 404. In this example, value 440 is "1". In one embodiment, 256 bytes of a t-node are reserved for the value. Thus, the t-node is optimized for the small values that are typical of registry key-value pairs. Because the value is stored within the t-node, one read operation is sufficient to obtain the value. In one embodiment, values larger than 256 bytes are not stored within the t-node; instead, such larger values are stored at a location to which the t-node points. A technique for storing larger values using indirection is described in greater detail in the section below entitled "USING INDIRECTION TO STORE VALUES AND KEY COMPONENT ENTRIES."

Like each t-node, t-node 438 includes key component entries for each child key of the key with which t-node 438 is associated. Therefore, t-node 438 includes a key component entry for key "B" 406. This key component entry includes a key component name ("B") 442, an offset 444, and other fields 446. Offset 444 provides the location, on the storage device, of a t-node (not shown) that is associated with key "B" 406.

Each t-node may also include version information, an owner identifier, a group identifier, access control information (e.g., privileges for users, groups of users, and others to perform selected ones of the operations described herein), a number of links to the t-node (e.g., from other t-nodes), a data type of the value of the key that corresponds to the t-node, a size of the value, a number of child keys of the key, a member number, a time that the t-node was created, a time that the t-node was last modified. The key name of the key does not need to be included in the t-node because the key name may be included in the parent t-node of the t-node. This reduces redundancy and preserves storage resources.

Given a request to enumerate all of the child keys of a specified key, reference may be made to the t-node of the specified key alone, instead of each of the child t-nodes. Consequently, fewer read operations are required, reducing access time. The reduction is especially magnified when key-value pairs have many child keys, as is usual for registry key-value pairs.

In one embodiment, the metadata that is contained in a t-node includes security attributes for the key that corresponds to the t-node. When a key is created, security attributes may be set so that particular users are restricted from performing specified operations relative to the key. In one embodiment, one of three user categories may be selected (e.g., "user", "group", and "world"). A permission set may be associated with each category. In one embodiment, when a user attempts to perform an operation relative to a key, that user's security privileges are examined first. If the user does not have sufficient privileges, then the user is not allowed to perform the operation.

In one embodiment, a t-node layout is organized as follows. The first 4 bytes have registry version information. The next 4 bytes are reserved for an owner identifier. The next 4 bytes are reserved for a group identifier. The next 3 bytes are used for access control information for users, groups, and others. The next 1 byte is used to hold the count of the number of links on the current t-node. Therefore, in one embodiment, the maximum number of links is 255. One byte is reserved to indicate whether the t-node is a member-dependent key. One byte is reserved for a data type of the value of the key that is associated with the t-node. The next 4 bytes are reserved for the size of the value data. The next 4 bytes are reserved for creation time information. The next 4 bytes are reserved for last modification time information. The next 4 bytes are used to hold the number of child keys, or key component entries, of the key that is associated with the t-node. In one embodiment approximately 64,000 child keys may be under each key. The next 256 bytes are used to store the value of the key that is associated with the t-node.

As described below, larger values may be stored through indirection. The next 80 (4*20) bytes contain logical addresses of 20 pages (described below) that accommodate up to 80 kilobytes of data through single indirection (described below). The next 4 bytes contain an address of a page that contains double indirect pages (described below) for value data, thus accommodating an additional gigabyte of data. The next 12 bytes, starting at byte offset 378, contain addresses of three pages that contain double indirect addresses (described below) of pages that contain key component entries. The next 100 bytes, beginning at byte offset 390, contain addresses of 25 pages that contain key component entries. The next 110 bytes are reserved for other uses. The rest of the space in the t-node is taken up by key component entries. Each key component entry represents one child key.

Using Indirection to Store Values and Key Component Entries

In one embodiment, a t-node is allocated to contain within itself, at most, a 256 byte value. It may sometimes be desirable to associate, with a key, a value that is larger than 256 bytes (or whatever limited amount of data storage space has been specified).

Therefore, in one embodiment, a t-node may include one or more addresses. For example, t-node 438 includes addresses 448. Each address may provide the location, on the storage device, of a different page. In one embodiment, each page is a different 4 kilobyte data storage space. Such pages are different than the registry pages discussed above. Such pages may be formatted as slotted page structures. The use of slotted page structures to store key component entries is described in greater detail in the section entitled "USING A SLOTTED PAGE STRUCTURE TO STORE KEY COMPONENT ENTRIES".

The first 256 bytes of a value are stored in the t-node itself. The remainder of the value may be divided into 4 kilobyte portions. Each portion may be stored in a different page. The addresses included in the t-node provide the locations of the pages, which need not be contiguous. So, for example, the first 4 kilobytes after the first 256 bytes of a value may be stored in a first page that is referenced by a first address, the next 4 kilobytes after that may be stored in a second page that is referenced by a second address, and the remainder of the value (which may be less than 4 kilobytes) may be stored in a third page that is referenced by a third address. Because each address refers directly to the location of a page, this technique is called "single indirection."

Because each t-node is limited to some size, a finite number of addresses may be stored in a t-node. In one embodiment, each address is 32 bytes long. Therefore, to store even larger values, each 4 kilobyte page referred to by one of addresses 448 may include one or more other addresses (a 4 kilobyte page may include up to 128 32-byte addresses). Each of these other addresses may, in turn, refer to a different 4 kilobyte page. Each of these different pages may store a different portion of the value. Because each address in the t-node refers to a page that includes addresses that refer to yet other pages, this technique is called "double indirection."

In other embodiments, additional levels of indirection may be used. Consequently, the specified size of a t-node imposes no limit on the size of a value that may be associated with a key.

Indirection may also be used to allow a parent key to have a greater number of child keys. As described above, a t-node contains key component entries for each child key of the key that is associated with the t-node. Because the size of a t-node is limited, a finite number of key component entries may be contained within a given t-node. In one embodiment, addresses contained in the t-node may refer to different pages that store key component entries in addition to those that are stored in the t-node itself. Any level of indirection is possible. Consequently, the specified size of a t-node imposes no limit on the number of keys that may be children of a particular key.

Using a Slotted Page Structure to Store Key Component Entries

Figure 4B:
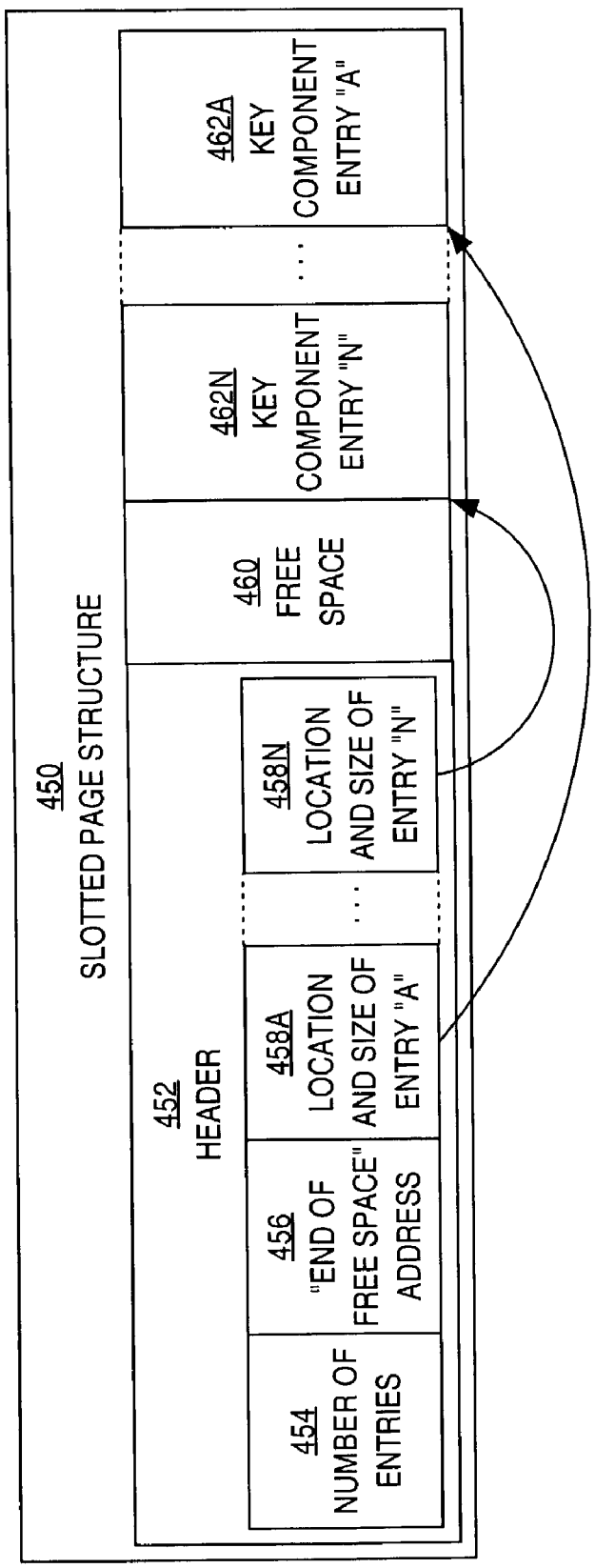
FIG. 4B is a block diagram that illustrates a slotted page structure that may be used to store key component entries, according to one embodiment.

FIG. 4B is a block diagram that illustrates a slotted page structure that may be used to store key component entries, according to one embodiment. In one embodiment, each t-node stores key component entries for the child keys of the key that is associated with that t-node in a slotted page structure that is contained within that t-node. In one embodiment, each t-node stores all metadata for the child keys of the key that is associated with that t-node in a slotted page structure that is contained within that t-node. The slotted page structure itself is a data structure that is well known.

Slotted page structure 450 includes a header 452, free space 460, and key component entries 462A–462N. Header 452 includes a number of entries 454. Number of entries 454 contains the number of key component entries that are stored in slotted page structure 450.

Header 452 also includes an "end of free space" address 456. "End of free space" address 456 contains the address of the end of free space 460. It is at this address that new key component entries are added to slotted page structure 460. In one embodiment, "end of free space" address 456 is a four byte address. In one embodiment, header 452 is located starting at byte offset 600 of a t-node.

Header 452 also includes an array 458A–458N that stores locations and sizes of each of the key component entries 462A–462N that are stored in slotted page structure 450. In array 458A–458N, the location and size of key component entry "A" 462 is indicated by location and size of entry "A" 458A. Likewise, the location and size of key component entry "N" 462N is indicated by location and size entry "N" 458N. Other locations and sizes of other key component entries may similarly by indicated in array 458A–458N.

Located between header 452 and key component entries 462A–462N is free space 460. Free space 460 is a contiguous space that shrinks as key component entries are added to the t-node and grows as key component entries are removed from the t-node.

Key component entries 462A–462N are the key component entries for the child keys of the key that is associated with the t-node. Key component entries are added starting at the end of the slotted page structure, and then towards the start of free space 460 with each new addition.

In one embodiment, when a key component entry is removed from slotted page structure 450, the key component entries closest to free space 460 are relocated so that the space formerly occupied by the removed key component entry is occupied. This relocation essentially "de-fragments" the key component entries, thus ensuring the contiguity of both free space 460 and key component entries 462A–462N.

Creating a Key

When a new child key is created under a key, a new t-node may be allocated for the child key. A key component entry may be created for the child key. The key component entry may be entered into the t-node of the parent key. If intermediate child keys do not exist, then the intermediate child keys may be created as a side-effect of the creation of the new child key. For example, if a child key named "a.b.c.d" is to be created, and only "a.b" currently exists, then "a.b.c" and "a.b.c.d" are both created.

If an intermediate child key is a link to another key, then the t-node address field may point to a t-node for the other key. Thus, in one embodiment, multiple key component entries may share a single t-node.

In one embodiment, to create a new key, user access control information, a key handle of a parent key of the new key, a key name of the new key, and security attributes of the new key are provided to a function. The function finds a part of the provided key name that is not common with the name of the key that is stored in the provided key handle. The function stores that part in the new key. For example, if the key name of the key handle contains "a.b.c", and the provided key name is "a.b.c.d.e", then the part stored in the new key is "d.e".

The function assigns the key handle to a temporary key handle. For each key component in the new key, the function does the following. The function finds a t-node that corresponds to the parent key using the temporary key handle. The function finds a t-node that corresponds to the key component. If the t-node that corresponds to the key component already exists, then the function assigns the t-node that corresponds to the key component to the temporary key handle.

If the t-node that corresponds to the key component does not already exist, then the function does the following. The function creates a key component entry in memory for the key component.

The function allocates a new t-node for the key component and inserts the address of the new t-node into the address field of the key component entry. The function may call another function to enter the key component entry into the t-node that corresponds to the parent key. The function assigns the handle of the newly created key to the temporary key handle.

After the function has done the above for each key component in the new key, the function may call another function to finish shadow updating of a list of free registry pages. The function marks the log space as being invalid. The function returns the key handle that is currently stored in the temporary key handle.

Finding a Key Component Entry in a T-Node

In one embodiment, to find a key component entry in a t-node, a key name and a t-node address are provided to a function. The function searches through the slotted page structure of the t-node at the address provided to the function. Using the array in the header of the slotted page structure, the function locates and reads key component entries. If the key name stored in a key component entry matches the key name provided to the function, then the function returns the address of the t-node and the offset of the key component entry that stores the matching key name. The function may also return a size of the key component entry that stores the matching key name.

If the function does not find the key name provided to the function in any of the key component entries in the slotted page structure, then the function searches directly addressed registry pages for the key name. If the function finds the key name, then the function returns the address of the t-node and the offset of the key component entry that stores the matching key name. The function may also return a size of the key component entry that stores the matching key name.

If the function does not find the key name provided to the function in any of the directly addressed registry pages, then the function searches indirectly addressed registry pages for the key name. If the key name is found, then the function returns the address of the t-node and the offset of the key component entry that stores the matching key name. The function may also return a size of the key component entry that stores the matching key name.

If the function does not find the key name in the slotted page structure or in the directly or indirectly addressed pages, then the function may return an error message.

Creating a New Key Component Entry in a T-Node

In one embodiment, to create a new key component entry in a t-node, a key component entry and a t-node address are provided to a function. Based on the t-node address, the function finds the registry page in which the key component entry is to be created. If there is not enough space to create the key component entry in the registry page, then another function is called to find a free page.

If there is enough space to create the key component entry in the registry page, then the function does the following. The function writes the t-node (at the address provided) into a log space. The function updates a count of key component entries that are in that t-node. The function sequentially scans through the header of the slotted page structure of the t-node to find the first empty entry. If there are no empty entries in the header, then the function creates a new entry at the end of the array that is in the header.

Once the function has found or created an empty entry, the function writes the key component entry provided to the function at the end of the free space in the slotted page structure. The function inserts size and location information of the new key component entry in a corresponding entry in the array in the header of the slotted page structure. Another function may be called to finish shadow updating of a list of free registry pages.

If there is not enough space to create the key component entry in the registry page, then the function does the following. The function initializes a new registry page with the slotted page structure. The function then performs the techniques described above, but in relation to the new registry page.

Whether or not there is enough free space to create the key component entry in the registry page, the log space mentioned above is marked as being invalid. The function returns an indication of success or failure based on whether the new key component entry was created.

Deleting a Key Component Entry from a T-Node

In one embodiment, to delete a key component entry from a t-node, a key name is provided to a function. The function finds a t-node that stores the key component entry that stores the provided key name by calling the function described below to find a t-node in which a key component entry for a key exists. The function decrements a count of key component entries in the t-node found. The function finds the key component entry that stores the provided key name by calling the function described above for finding a key component entry in a t-node. The function makes an entry in a registry page log and writes the t-node's registry page into the registry page log space. The function deletes the key component entry that stores the provided key name from the slotted page structure. Another function may be called to finish shadow updating of a list of free registry pages. The function marks the log space as being invalid. The function returns an indication of success or failure based on whether the key component entry was deleted.

Finding a T-Node in which a Key Component Entry for a Key Exists

In one embodiment, to find a t-node in which a key component entry for a key exists, a key name is provided to a function. The function parses the key name to separate the key components of the provided key name. The function reads the root registry page. For each of the key components of the provided key name, the function does the following.

The function finds the key component entry for the key component by calling the function described above in the section titled "FINDING A KEY COMPONENT ENTRY IN A T-NODE" to find a key component entry in a t-node. If the function cannot find the t-node, then the function may return an error. Otherwise, the function reads the t-node that was found.

After doing the above for each of the key components of the provided key name, the function returns the t-node that was most recently read (i.e., the current t-node).

Setting a Value of an Empty T-Node

In one embodiment, to set a value of an empty t-node, a value and a t-node are provided to a function. The function may return an error if the size of the value is greater than a maximum permitted value size. Otherwise, the function scans through a list of free registry pages to find the total size of the available free space. The function may return an error if the size of the free space is less than the size of the value.

Otherwise, the function makes an entry for the operation in the registry page log space. The function writes the t-node into the registry page log space. The function writes the size of the value in a field of the t-node that is reserved for the size of the value. In one embodiment, the function writes the first 256 bytes of the value in the field of the t-node that is reserved for the value. If the size of the value is 256 bytes or less, then the function returns an indication that the operation was successful.

Otherwise, based on the size of the value, the function allocates direct and possibly indirect pages (if the value is sufficiently large) for the value by updating the t-node and the list of free registry pages. The function writes the value in the allocated pages. If any error occurs while writing, then the function may return an error. Otherwise, another function may be called to finish shadow updating of the list of free registry pages. The function marks the log space as being invalid. The function returns an indication of success or failure based on whether the value was stored.

Modifying the Value of a T-Node

In one embodiment, to modify a value of a t-node, a new value and a t-node are provided to a function. If the size of the new value exceeds a maximum permitted size, then the function may return an error. Otherwise, the function scans through a list of free registry pages to find a total size of free space available. The function reads the t-node to find the current size of the existing (old) value. If the sum of the total available free space and the current size of the existing value is not greater than the size of the new value, then the function may return an error.

Otherwise, the function makes an entry for the operation in the registry page log space. The function writes the t-node into the registry page log space. The function writes the size of the new value in the field of the t-node that is reserved for the value of the t-node. If the size of the new value is small enough so that one or more registry pages can be freed, then the function writes those one or more registry pages into the registry page log space and modifies the list of free registry pages.

Regardless of whether the function modifies the list of free registry pages, in one embodiment, the function writes the first 256 bytes of the new value in the field reserved for the value in the t-node. If the size of the new value is 256 bytes or less, then the function returns an indication of success. Otherwise, if the size of the new value is greater than the size of the existing value and new registry pages should be acquired to store the new value, then the function calls another function to find a free page. The function writes the new value in the pages allocated.

If any error occurs while writing, then the function may return an error. Otherwise, the function may call another function to finish shadow updating of the list of free registry pages. The function marks the log space as being invalid. The function returns an indication of success or failure based on whether the value was stored.

Opening a Key

In one embodiment, to open a key, user access control information and a key name are provided to a function. The function searches for a t-node that stores the key name, possibly by calling another function that is designed to find a t-node. If the key does not exist, or if access to the key is not permitted based on the user access control information, then the function may return an error.

Otherwise, the function inserts a key component entry for the key into a key handle. The function inserts security attributes for the key into the key handle. The function then returns the key handle.

Reading the Value of a Key

In one embodiment, to read the value a key, user access control information, a key handle (such as may be returned by the function for opening a key, as described above), an address of a buffer in which a read value is to be stored, and an address at which a size of the buffer is stored are provided to a function. The function obtains an address of a t-node based on the provided key handle. If the provided size of the buffer is zero, then the function may return an error.

Otherwise, the function reads user security attributes from the provided user access control information. The function reads key security attributes from the provided key handle. The function checks if the user indicated in the user access control information has sufficient privileges to access the key by calling another function. If the check is not successful, then the function may return an error.

Otherwise, the function reads the t-node from a disk into memory. The function reads the size of the value that is stored in the t-node. If the size of the value is greater than the provided size of the buffer, then the function may insert the size of the data at the address where the size of the buffer was stored, and return an error.

Otherwise, in one embodiment, the function reads the first 256 bytes of the value from the field in the t-node that stores the value. The function stores this at the address of the buffer provided. If the size of the value is more than 256 bytes, then the function reads directly addressed pages. The function appends the information read from the directly addressed pages to the data that is stored in the provided buffer. The function does not stop reading the directly addressed pages until the entire value has been read. The function inserts the total number of bytes read at the address where the size of the buffer was stored. The function may return an indication of success.

Creating a Key and Setting the Value of the Key

In one embodiment, to create a new key and set the value of the new key, user access control information, a function may call another function to create a key, such as is described above. However, shadow updating is not finished, and the registry page log is not marked as being invalid. After the key is created, the function may set the value of the new key by calling another function to set the value of a key, such as is described below in the section "SETTING THE VALUE OF A KEY", after that shadow updating is finished and the log is marked as being invalid.

Creating a Link

In one embodiment, to create a link, user access control information, a key handle of an open destination key, a key name of a source key, and security attributes of the source key are provided to a function. The function reads a t-node of the destination key using an address that is located in the provided key handle of the destination key. This t-node may be referred to as the destination t-node.

If the number of existing links on the key exceeds some specified threshold, then the function may return an error.

Otherwise, the function creates an image of the destination t-node in the registry page log. The function updates a link count of the destination t-node. The function finds a t-node that corresponds to a parent key of the source key (whose key name was provided). This t-node may be referred to as the source t-node. The function creates, in memory, a key component entry for the provided key name. The function inserts the address of the destination t-node into a t-node address field of the key component entry. The function enters the key component entry into the source t-node. The function deletes log records that were involved in the operation. The function may call another function to finish shadow updating if needed. The function returns a key handle.

Setting a Security Attribute of a Key

In one embodiment, to set a security attribute of a key, user access control information, a key handle of an opened key, and new security attributes for the opened key are provided to a function. If the user identified by the user access control information does not have sufficient privileges to access the key, then the function may return an error.

Otherwise, the function reads a t-node that corresponds to the provided key handle. The function creates a record of the t-node in the registry page log. The function updates the t-node in memory and then writes the t-node to the disk. The function marks the registry page log as being invalid.

Setting a Value of a Key

In one embodiment, to set a value of a key, user access control information, a key handle of an opened key, a pointer to a buffer that contains the new value, a type of the new value, and the size of the new value are provided to a function. If the user identified by the user access control information does not have sufficient privileges to access the key, then the function may return an error. If the provided size of the new value is equal to zero, then the function may return an error.

Otherwise, the function retrieves the t-node that corresponds to the provided key handle. The address of the t-node may be obtained by a previously called function, such as the function described above with reference to opening a key. The function may use another function, such as the function described above in the section "MODIFYING A VALUE OF A T-NODE" to modify the value of the retrieved t-node. If this other function returns an error, then the error is passed along.

Otherwise, the function may mark the registry page log as being invalid and return an indication of success.

Deleting a Value of a Key

In one embodiment, to delete a value of a key, user access control information and a key handle of an opened key are provided to a function. If the key component entry for the key is already empty (e.g., signified by the t-node's address being equal to 0x0000), then the function may return an error.

Otherwise, the function reads the t-node for the key. The function writes, in the registry page log space, the value of each registry page that contains the value of the key. The function creates a shadow of a list of free registry pages, possibly by calling another function designed to create such a shadow. The function updates the shadow by marking every registry page that contains the value of the key as being a free registry page. The function writes t-node for the key into the registry page log space. The function updates the t-node by making the value field of the t-node empty, making the value size of the t-node zero, and marking direct and indirect addresses in the t-node as being empty.

If the t-node does not contain any key component entries, then the function does the following. The function frees the t-node by updating the corresponding registry page. The function locates, on the disk, a key component entry for the key. The function sets the address of the key component entry on the disk to 0x0000.

The function may call another function to finish shadow updating of data structures. The function marks the log space as being invalid.

Deleting a Key

In one embodiment, to delete a key, user access control information and a key handle of an opened key are provided to a function. If the key component entry for the key is already empty (e.g., signified by the t-node's address being equal to 0x0000), or if the key has child keys, then the function may return an error.

Otherwise, the function reads a t-node from a disk by using the address of the t-node that is stored in the key component entry that is stored in the provided key handle. If the value size for the key is not equal to zero, then the function may return an error. If the count of the total number of key component entries is not equal to zero, then the function may return an error.

If the function does not return an error, then the function does the following. The function locates, on the disk, a registry page that contains the key component entry for the key. The function reads the located registry page into memory. The function writes the registry page into the registry log space, possibly by calling another function that writes to the registry log space. The function deletes the key component entry in the registry page that is stored in memory by calling another function, such as the function described above in the section titled "DELETING A KEY COMPONENT ENTRY FROM A T-NODE". The function may call another function to finish shadow updating of data structures. The function marks the log space as being invalid. The function may return an indication of success.

Recovery of Registry Operations

According to one embodiment, every operation performed on a registry page is atomic. If a failure occurs during an operation, then a recovery mechanism recovers the last unfinished operation before another operation may be performed. In one embodiment, a log valid bit vector is maintained, in boot block 210, for each member of a distributed system that shares the shared repository. In one embodiment, the log valid bit vector is 128 bits long.

An example of a technique for recovering registry operations, according to one embodiment, is described below.

First, any earlier log record is marked as being invalid.

Next, information about the operation is logged (i.e., written to registry log 280) prior to the performance of the operation. Sufficient information is logged so that the operation may be undone. For example, a log sequence number (such as a counter), an operation type, a key name, a member identifier (such as a member number), and a list of involved t-nodes may be logged. The t-nodes in the list are logged.

The information logged may differ depending on the operation to be performed. For example, if the operation is to create a key, then a parent t-node of a t-node that will represent that key is logged. If the operation is to delete a value of a key, then a t-node that represents the key that stores the value is logged. If the operation is to set security attributes of a key, then a t-node that represents the key for which the values are to be set is logged.

If the operation is to set a value of a key, then the information logged may differ depending on a number of registry pages needed for the old value of the key and a number of registry pages needed for a new value of the key. If the number of pages needed for the old value is the same as the number of pages needed for the new value, then the t-nodes that stored the old value are logged. If the number of pages needed for the old value is greater than the number of pages needed for the new value, then as many t-nodes that stored the old value as are in the number of pages needed for the new value are logged. If the number of pages needed for the old value is less than the number of pages needed for the new value, then as many t-nodes that stored the old value as are in the number of pages needed for the old value are logged.

If the operation is to create a key and set the value of the key, then the same information that is logged for the create key and set key value operations is logged.

Whatever information is written to registry log 280, next registry log 280 is marked as being valid. This is accomplished in one atomic operation by rewriting boot block 210.

Next, the operation is performed. If the operation involves the allocation or freeing of registry pages, then that allocation and/or freeing is tracked. Boot block 210, superblock 220, and free list space and shadow 240 are maintained in memory. When the operation is finished, then boot block 210, superblock 220, and free list space and shadow 240 are persisted to permanent storage (e.g., a hard disk).

After the operation has been performed, then the log is marked as being invalid inside an in-memory copy of boot block 210. Metadata may be shadow updated. Finally, the in-memory copy of boot block 210 is written to permanent storage in one atomic operation.

The writing to boot block 210 and the marking of registry log 280 as being invalid is achieved in one write operation. In other words, in one atomic write operation, a "log valid" bit inside of boot block 210 is modified and metadata (e.g., superblock 220 and free list space and shadow 24) is shadow updated. As a result, if the system happens to crash, then registry log 280 will still be marked as being valid, which indicates that recovery should be performed. Furthermore, if the system happens to crash, then the metadata will still refer to copies of data structures that exist in the same state as before the operation was started.

After a possible failure (e.g., when a system is booted), it is determined whether the log is marked as being valid. If the log is marked as being invalid, then no recovery is needed. If the log is marked as being valid, then the t-nodes that are listed in a logged list of t-nodes are copied back to their respective locations in registry pages 260. After the t-nodes are copied, then the log is marked as being invalid. If another failure occurs during the recovery itself, then recovery is attempted again in the same manner.

Hardware Overview

Figure 5:
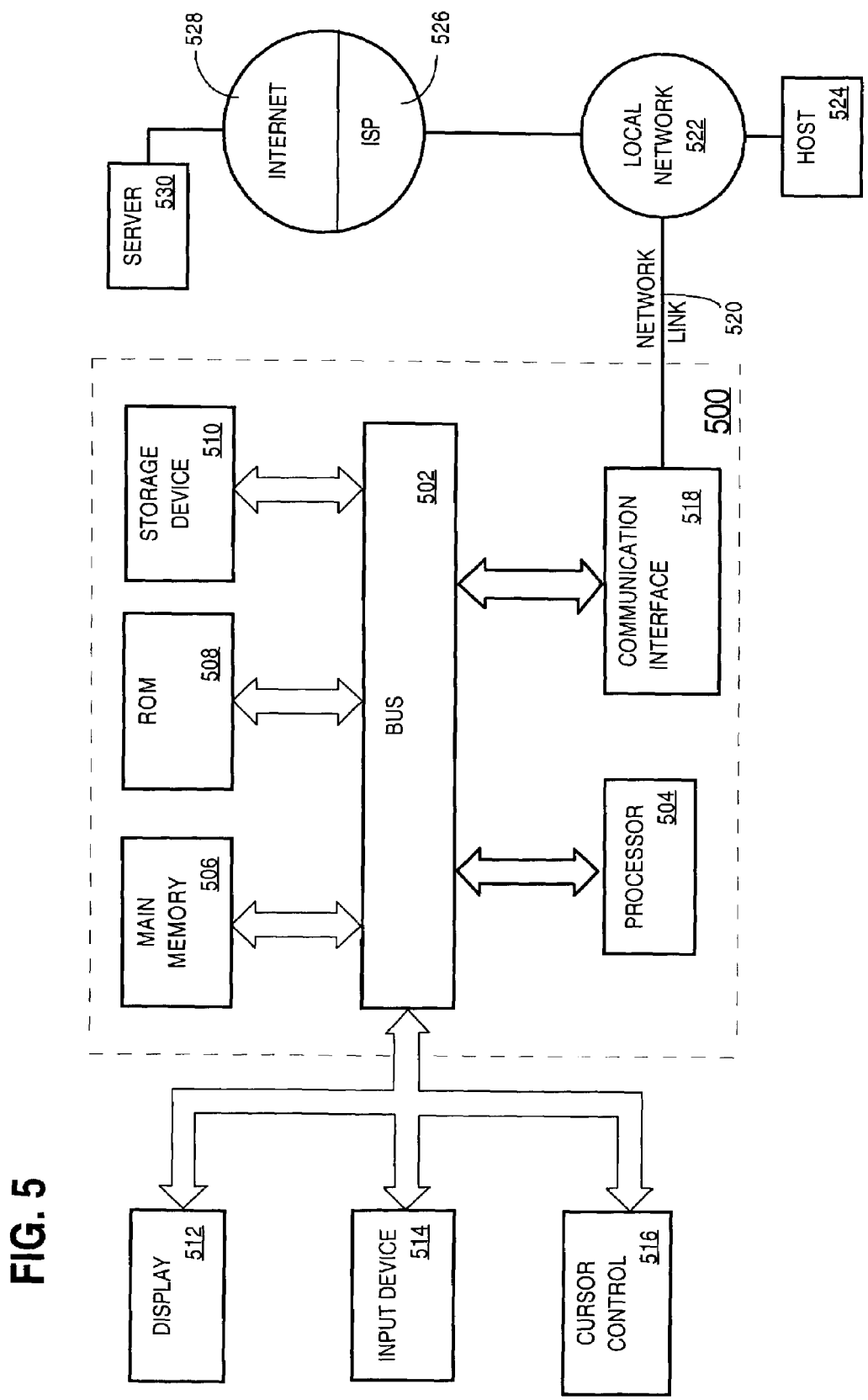
FIG. 5 is a block diagram that illustrates a computer system 500 upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510.

Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A computer-implemented method for formatting a persistent storage device to store hierarchical data, the method comprising:
   establishing structures, at a base level of the persistent storage device, for storing a hierarchy of key-value pairs;
   wherein the step of establishing structures includes:
      establishing a first structure that corresponds to a root node of the hierarchy;
      establishing a second structure that corresponds to a first key-value pair;
      wherein said first key-value pair has a particular key and a particular value;
      wherein said second structure stores said particular value; and
      establishing links that lead from said first structure, through one or more intermediate structures, to said second structure based on a position, within said hierarchy, of said particular key.

2. The method of claim 1, wherein:
   said second structure includes at least a part of a key of a second key-value pair that is subordinately related, within said hierarchy, to said first key-value pair.

3. A computer-implemented method for storing hierarchical data on a persistent storage device, the method comprising:
   storing, in a data structure that corresponds to a particular key in a hierarchy of keys, both (a) data that is associated with the key and (b) metadata that is associated with the data;
   receiving a request to perform an operation relative to the particular key; and
   in response to the request, performing steps comprising:
      determining, based on security attributes that are contained in said metadata, whether a user has sufficient privileges to perform the operation relative to the particular key;
      if the user has sufficient privileges to perform the operation relative to the particular key, then performing the operation relative to the particular key; and
      if the user does not have sufficient privileges to perform the operation relative to the particular key, then preventing performance of the operation relative to the particular key;
   wherein the data structure is stored on the persistent storage device.

4. The method of claim 3, further comprising:
   prior to storing said data and said metadata on said persistent storage device, updating said data and said metadata in volatile memory.

5. The method of claim 3, wherein said storing of said data is performed in a same block access to said persistent storage device as said storing of said metadata.

6. The method of claim 3, wherein:
   said request is a request to create a child key of said particular key;
   the step of determining whether the user has sufficient privileges comprises
      determining, based on security attributes that are contained in said metadata, whether the user has sufficient privileges to create said child key of said particular key; and
   the step of performing the operation comprises:
      creating a new data structure, which corresponds to said child key, on said persistent storage device; and
      creating a key component entry for said child key in said data structure that corresponds to said particular key.

7. The method of claim 3, wherein:
   said request is a request to delete said particular key;
   the step of determining whether the user has sufficient privileges comprises
      determining, based on security attributes that are contained in said metadata, whether the user has sufficient privileges to delete said particular key; and
   the step of performing the operation comprises deleting a key component entry, which corresponds to said particular key, from a data structure that corresponds to a parent key of said particular key.

8. The method of claim 3, wherein:
   said request is a request to read a value of said particular key;
   the step of determining whether the user has sufficient privileges comprises
      determining, based on security attributes that are contained in said metadata, whether the user has sufficient privileges to access said particular key; and
   the step of performing the operation comprises providing said data to said user.

9. The method of claim 3, wherein:
   said request is a request to set a value of said particular key;
   the step of determining whether the user has sufficient privileges comprises
      determining, based on security attributes that are contained in said metadata, whether the user has sufficient privileges to access said particular key; and
   the step of performing the operation comprises updating said data.

10. The method of claim 3, wherein:
   said request is a request to create a link from a source key to said particular key;
   the step of determining whether the user has sufficient privileges comprises
      determining, based on security attributes that are contained in said metadata, whether the user has sufficient privileges to create said link; and the step of performing the operation comprises creating, in a data structure that corresponds to a parent key of said source key, a key component entry for said particular key.

11. The method of claim 3, further comprising storing, in said metadata, privileges for one or more users to perform selected operations in a set of specified operations, privileges for one or more groups of users to perform selected operations in said set of operations, and privileges for entities other than said users and groups to perform selected operations in said set of operations.

12. The method of claim 3, further comprising:
determining whether a data log is valid; and
if said data log is valid, then:
  overwriting one or more data structures, which represent keys that were involved in a failed operation, with copies of said data structures that are stored in said data log; and
  causing said data log to be invalid.

13. The method of claim 3, further comprising:
in response to said request, performing, in an atomic operation:
  updating a superblock shadow to reflect a change; and
  updating a boot block to refer to said superblock shadow instead of a superblock;
wherein, if a system failure occurs during said atomic operation, said boot block refers to said superblock instead of said superblock shadow.

14. A computer-implemented method for storing hierarchical data on a persistent storage device, the method comprising:
receiving a request to store information relative to a particular key in a hierarchy of keys;
in response to the request, storing, in a first data structure that corresponds to the particular key, as much of the information as one or more specified fields of the data structure are capable of containing;
storing, in a second data structure, a part of said information that was not stored in said first data structure; and
storing, in said first data structure, location information for locating said second data structure
wherein said first data structure and said second data structure are stored on the persistent storage device.

15. The method of claim 14, wherein said information is a value of said key.

16. The method of claim 14, wherein said information is a plurality of key component entries for child keys of said key.

17. The method of claim 14, further comprising:
storing, in a third data structure, a part of said information that was not stored in said first data structure; and
storing, in said second data structure, location information for locating said third data structure.

18. A tangible computer-readable medium having stored thereon:
a data structure that corresponds to a first node in a key-value hierarchy, wherein said first node is associated with a particular key of a first key-value pair, wherein said first node includes:
  a value of said first key-value pair; and
  at least a part of a key of a second key-value pair that is associated with a child node of said first node in said key-value hierarchy.

19. A tangible computer-readable medium that carries instructions which, when executed by one or more processors, cause the one or more processors to perform the method of claim 3.

20. A tangible computer-readable medium that carries instructions which, when executed by one or more processors, cause the one or more processors to perform the method of claim 4.

21. A tangible computer-readable medium that carries instructions which, when executed by one or more processors, cause the one or more processors to perform the method of claim 5.

22. A tangible computer-readable medium that carries instructions which, when executed by one or more processors, cause the one or more processors to perform the method of claim 6.

23. A tangible computer-readable medium that carries instructions which, when executed by one or more processors, cause the one or more processors to perform the method of claim 7.

24. A tangible computer-readable medium that carries instructions which, when executed by one or more processors, cause the one or more processors to perform the method of claim 8.

25. A tangible computer-readable medium that carries instructions which, when executed by one or more processors, cause the one or more processors to perform the method of claim 9.

26. A tangible computer-readable medium that carries instructions which, when executed by one or more processors, cause the one or more processors to perform the method of claim 10.

27. A tangible computer-readable medium that carries instructions which, when executed by one or more processors, cause the one or more processors to perform the method of claim 11.

28. A tangible computer-readable medium that carries instructions which, when executed by one or more processors, cause the one or more processors to perform the method of claim 12.

29. A tangible computer-readable medium that carries instructions which, when executed by one or more processors, cause the one or more processors to perform the method of claim 13.

30. A tangible computer-readable medium that carries instructions which, when executed by one or more processors, cause the one or more processors to perform the method of claim 14.

31. A tangible computer-readable medium that carries instructions which, when executed by one or more processors, cause the one or more processors to perform the method of claim 15.

32. A tangible computer-readable medium that carries instructions which, when executed by one or more processors, cause the one or more processors to perform the method of claim 16.

33. A tangible computer-readable medium that carries instructions which, when executed by one or more processors, cause the one or more processors to perform the method of claim 17.

* * * * *